(12) United States Patent
Sato et al.

(10) Patent No.: US 7,029,582 B2
(45) Date of Patent: Apr. 18, 2006

(54) FUEL FILTER DEVICE

(75) Inventors: Hiroji Sato, Tokyo (JP); Hideaki Takahashi, Kanagawa (JP)

(73) Assignee: NIFCO Inc., Yokohama (JP)

( * ) Notice: Subject to any disclaimer, the term of this patent is extended or adjusted under 35 U.S.C. 154(b) by 0 days.

(21) Appl. No.: 10/873,310

(22) Filed: Jun. 23, 2004

(65) Prior Publication Data

US 2005/0006300 A1   Jan. 13, 2005

(30) Foreign Application Priority Data

Jul. 10, 2003   (JP)   ............................. 2003-272972

(51) Int. Cl.
*B01D 35/02* (2006.01)
*F02M 37/22* (2006.01)

(52) U.S. Cl. .................... 210/232; 210/416.4; 210/484

(58) Field of Classification Search ................ 210/232, 210/416.1, 416.4, 483, 484, 485, 488, 489, 210/459, 460

See application file for complete search history.

(56) References Cited

U.S. PATENT DOCUMENTS

| | | | |
|---|---|---|---|
| 4,420,396 A | | 12/1983 | Yamamoto et al. |
| 4,844,704 A | | 7/1989 | Jiro |
| 4,853,123 A | * | 8/1989 | Hayes et al. ................. 210/316 |
| 5,547,568 A | * | 8/1996 | Sasaki ......................... 210/172 |
| 5,695,638 A | * | 12/1997 | Gubitz et al. ............. 210/416.4 |
| 5,728,292 A | | 3/1998 | Hashimoto et al. |

(Continued)

FOREIGN PATENT DOCUMENTS

| | | | |
|---|---|---|---|
| DE | 44 34 560 | | 4/1996 |
| EP | 1495789 | * | 1/2005 |
| JP | 07-148405 | | 6/1995 |
| JP | 2003-028019 | | 1/2003 |
| JP | 2003-042033 | | 2/2003 |

OTHER PUBLICATIONS

Abstract of Japan: Patent No. 2003042033, Publication Date Feb. 13, 2003, Applicant NIFCO Inc, Title Filter Device for Fuel.

(Continued)

*Primary Examiner*—Fred G. Prince
(74) *Attorney, Agent, or Firm*—Manabu Kanesaka (57) ABSTRACT

A fuel filter device includes a first member made of a plastic and having a connecting portion to be connected to a fuel intake port, and a second member made of a plastic and assembled with the first member for forming an interior space communicating with the connecting portion. One or both of the first member and the second member are provided with a fuel intake portion, and a filter member having a single layer structure or a multi-layer structure in a sheet shape or a mat shape is disposed between the first member and the second member to cover the inflow portion from a side of the interior space. Accordingly, the filter device can be easily and adequately produced.

10 Claims, 13 Drawing Sheets

U.S. PATENT DOCUMENTS

| | | | |
|---|---|---|---|
| 5,972,213 A | 10/1999 | Golan | |
| 6,533,932 B1 * | 3/2003 | Kallberg et al. | 210/232 |
| 6,582,599 B1 * | 6/2003 | Ito et al. | 210/416.1 |
| 6,706,183 B1 * | 3/2004 | Ito et al. | 210/416.1 |
| 6,830,687 B1 * | 12/2004 | Dockery et al. | 210/416.4 |
| 2003/0042185 A1 * | 3/2003 | Dockery | 210/132 |
| 2005/0087485 A1 * | 4/2005 | Takahashi | 210/232 |

OTHER PUBLICATIONS

Abstract of Japan: Patent No. 2003035232, Publication Date Feb. 7, 2003, Applicant Toyo Roki Mfg Co Ltd, Title Fuel Supply Device.

* cited by examiner

FUEL FILTER DEVICE

BACKGROUND OF THE INVENTION AND RELATED ART STATEMENT

The present invention relates to an improvement of a filter device attached to a fuel intake port in a fuel tank for preventing water or foreign matters from entering fuel to be transferred to an internal combustion engine through the fuel intake port.

Patent References No. 1 to No. 3 have disclosed filter devices to be attached to a fuel intake port in a fuel tank of an automobile, motorcycle or the like for preventing water or foreign matters from entering fuel to be transferred to an internal combustion engine through the fuel intake port.

Those filter devices include a filter member formed in a bag shape; a space forming member for retaining the filter member in an expanded bag shape; and a connecting portion formed in a cylindrical shape communicating with an interior space of the filter member and having a cylindrical upper end attached to the fuel intake port.

However, in these filter devices, in view of the structure, the following steps are required for production.

(1) A step of cutting a filtering material constituting a filter member;

(2) A step of integrally attaching the connecting portion to the filtering material by injection molding of a plastic with the filtering material as an insert;

(3) A step of applying heat seal to the filtering material and forming the filtering material into a filter member with a bag shape after wrapping a space forming member with the filtering material; and (4) A step of cutting an unused portion of the filter member outside the thermal seal.

Also, in these filter devices, the connecting portion is attached to the filtering material by an insertion molding. Accordingly, it is necessary to form the filter member with a synthetic resin material having good compatibility with a synthetic resin material constituting the connecting portion.

Patent Reference No. 1
Japanese Patent Publication (Kokai) No. 2003-28019
Patent Reference No. 3
Japanese Patent Publication (Kokai) No. 2003-42033
Patent Reference No. 3
Japanese Patent (Kokai) No. 3353986

In view of the problems described above, an object of the invention is to provide a fuel filter device which can be easily and appropriately produced.

Further objects and advantages of the invention will be apparent from the following description of the invention.

SUMMARY OF THE INVENTION

According to the present invention, a fuel filter device includes a first plastic member having a connecting portion to be connected to a fuel intake port; and a second plastic member attached to the first member for forming an interior space communicating with the connecting portion. One or both of the first member and the second member is provided with a fuel intake portion. A filter member having a single layer structure or a multi-layer structure in a sheet shape or a mat shape is disposed between the first member and the second member for covering the fuel intake portion from the interior space.

In the filter device according to the invention, the filter member formed in a shape and size to be fitted between the first member and the second member is disposed therebetween. Then, the two members are assembled to form the filter device in which fuel entering into the interior space is properly filtered and sent to the fuel intake portion, thereby easily producing the filter device.

Also, it is not necessary to integrate the filter member with the two members with welding or the like. Accordingly, the filter device can be designed without considering compatibility between a material of the filter member and a material of the two members. As a result, it is possible to form the first member and the second member constituting the main portions of the filter device with a plastic material having high fuel resistance, thereby improving quality of the filter device.

It is also possible to weld the first member and the second member together at combined portions thereof.

In this case, it is possible to effectively increase a joint strength of the two members. At the same time, it is possible to securely prevent the fuel from flowing in through the combined portions of the two members, thereby preventing unfiltered fuel from flowing in the interior space of the filter device.

It is also possible to dispose a shape retaining member having a plurality of fuel passing portions between the first member and the second member.

In this case, a first filter member may be sandwiched between the first member and the shape retaining member, and a second filter member may be sandwiched between the second member and the shape retaining member, so that the first member and the second member are combined with the shape retaining member therebetween.

In this case, it is possible to prevent the interior space of the filter device from being narrowed by a fuel intake pressure. In other words, the inner surface of the first member and the inner surface of the second member do not approach each other by such a pressure. Accordingly, it is possible to prevent a filtration effective area of the filter member from being limited to the vicinity of the combined portions.

Also, the filter member may be formed in a size to be disposed between the first member and the second member. Accordingly, the filter member is easily disposed between the two members in a state that the intake portion is adequately covered with the filter member all the time.

A shape retaining projection may be formed on one of the first member and the second member for projecting toward a flowing-in portion provided on the other of the two members.

In this case, the filter member may be sandwiched between the shape retaining projection and the other member where the shape retaining projection is not provided, when the first member and the second member are combined.

In this case, it is possible to prevent the interior space of the filter device from being narrowed by the fuel intake pressure. In other words, the inner surface of the first member and the inner surface of the second member do not approach each other by such a pressure. Accordingly, it is possible to prevent the filtration effective area of the filter member from being limited to the vicinity of the combined portions.

Also, the filter member may be molded in a size to be disposed between the first member and the second member. Accordingly, the filter member is easily disposed between the two members in a state that the intake portion is adequately covered with the filter member all the time.

According to the present invention, it is possible to easily produce the filter device.

DETAILED DESCRIPTION OF PREFERRED EMBODIMENTS

Hereunder, embodiments of the present invention will be described with reference to FIGS. 1 to 17.

Figure 1:
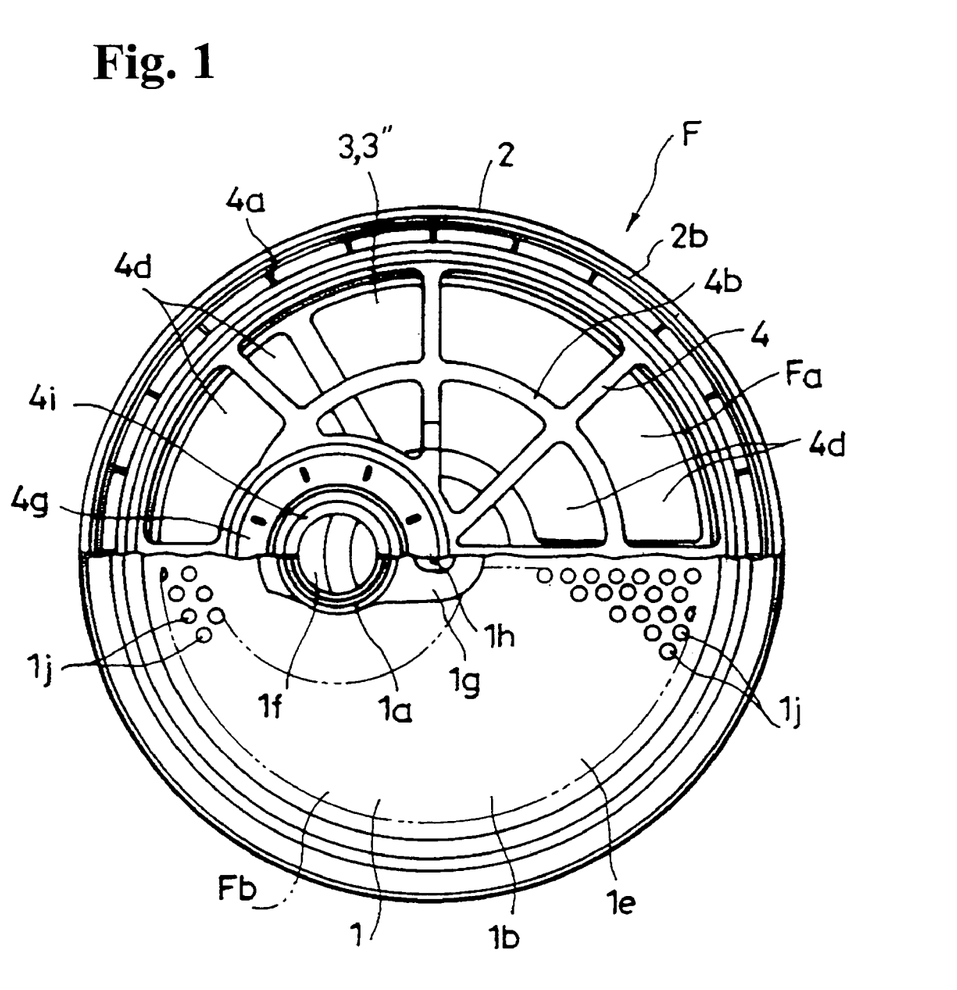
FIG. 1 is a partial sectional plan view of a filter device F.
Figure 2:
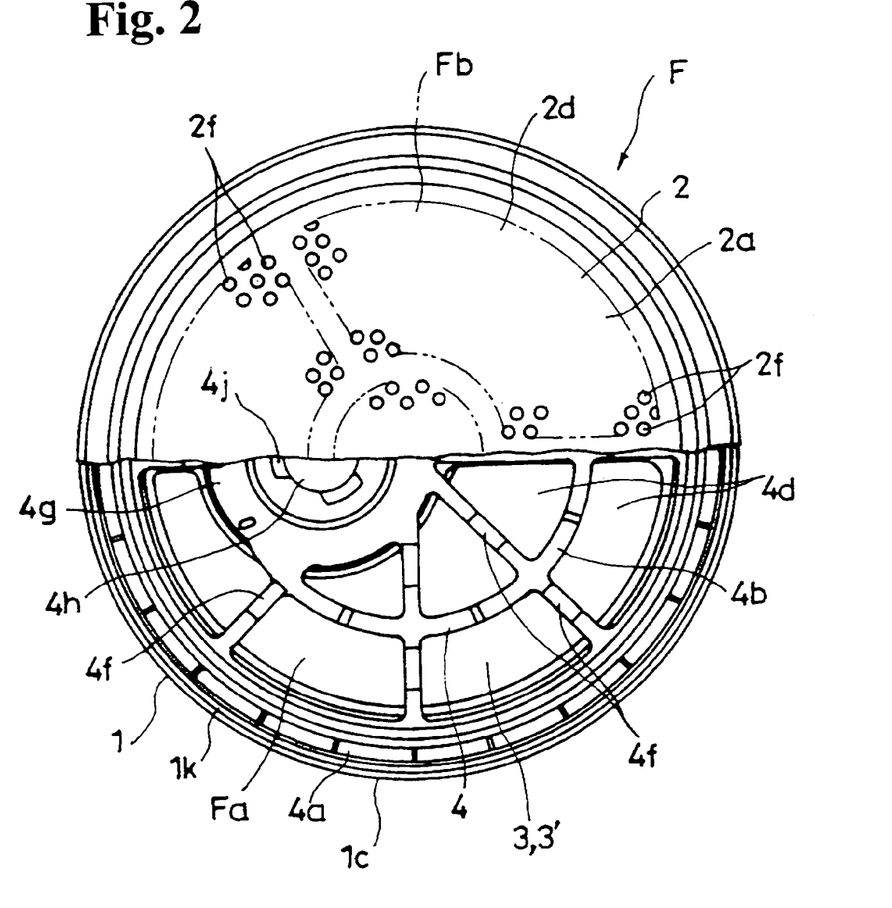
FIG. 2 is a partial sectional bottom view thereof.
Figure 3:
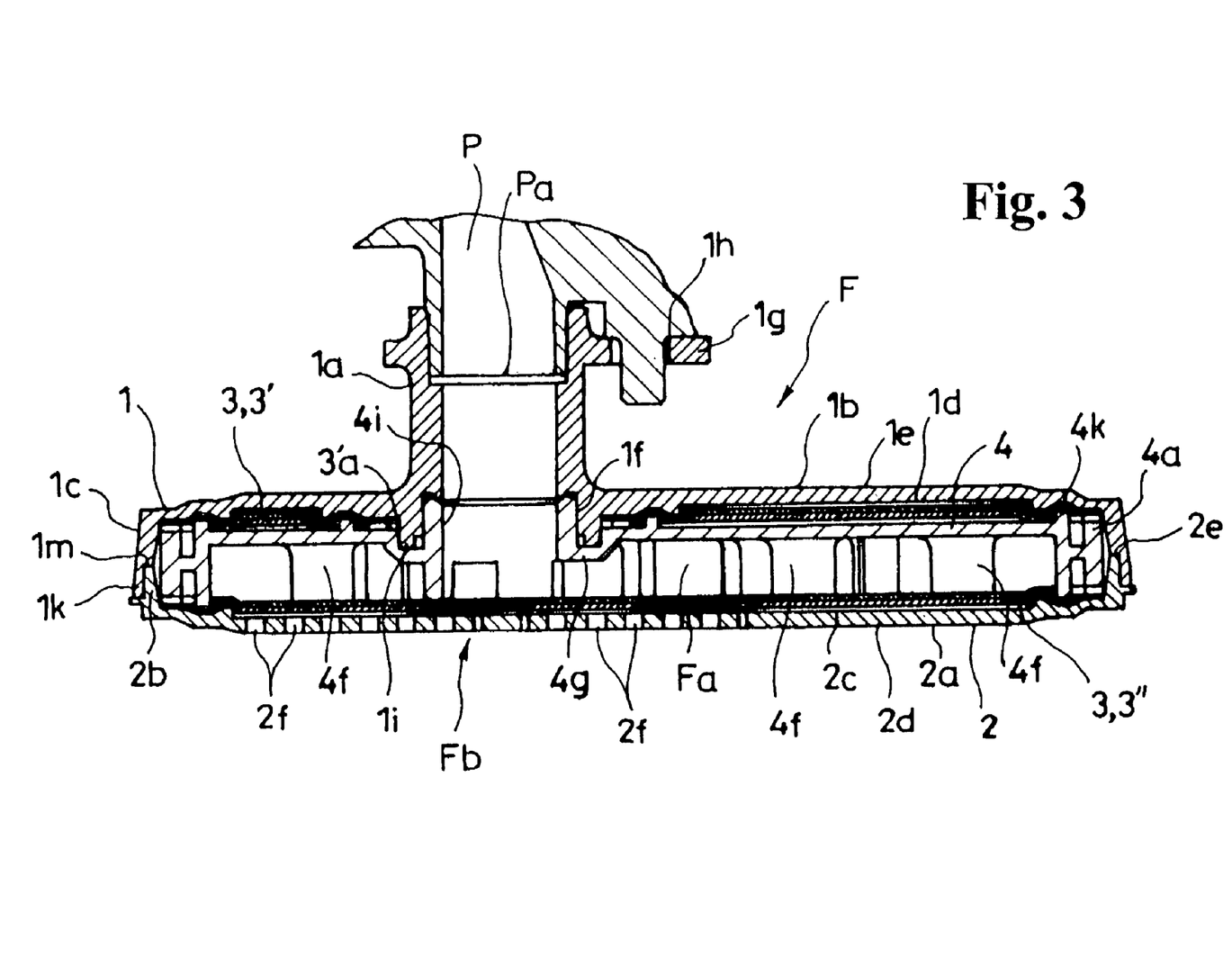
FIG. 3 is a sectional view thereof in a use state.
Figure 4:
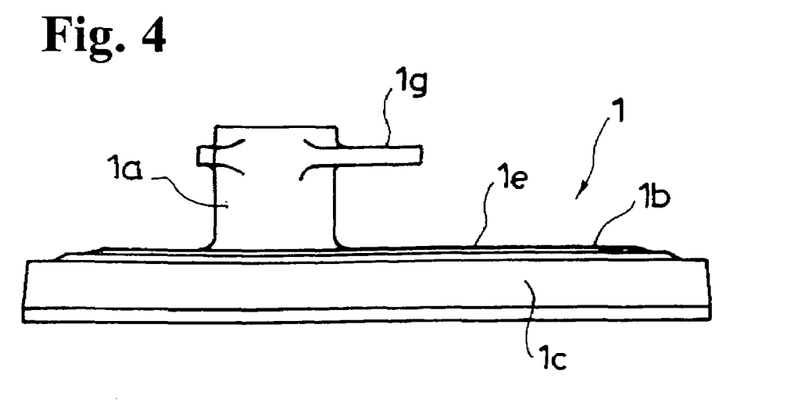
FIG. 4 is a side view of a first member.
Figure 5:
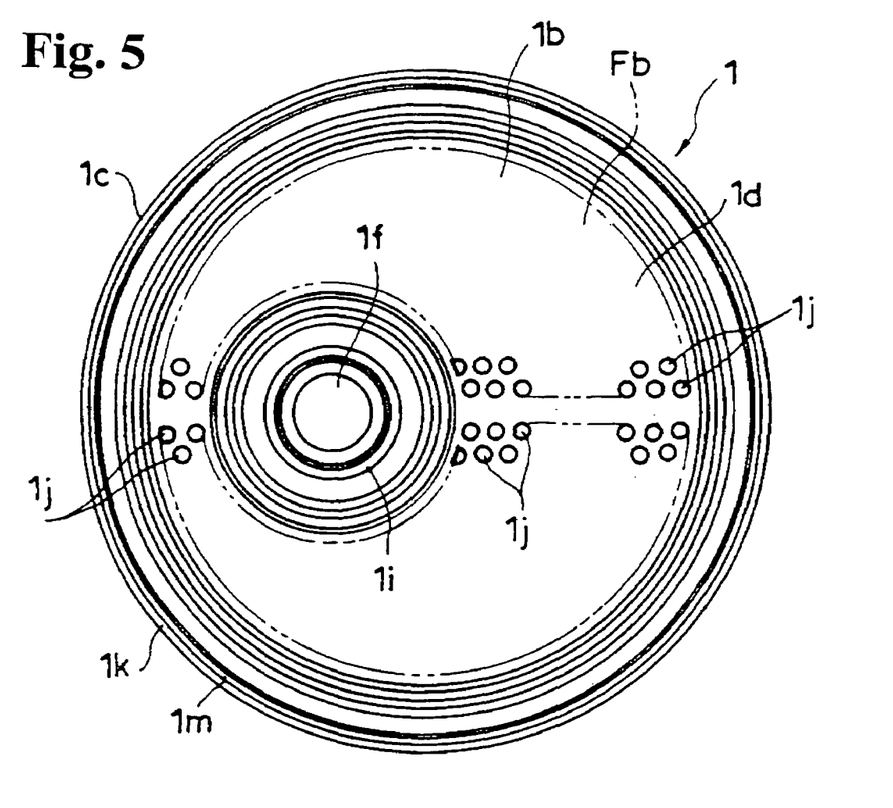
FIG. 5 is a bottom view thereof.
Figure 6:
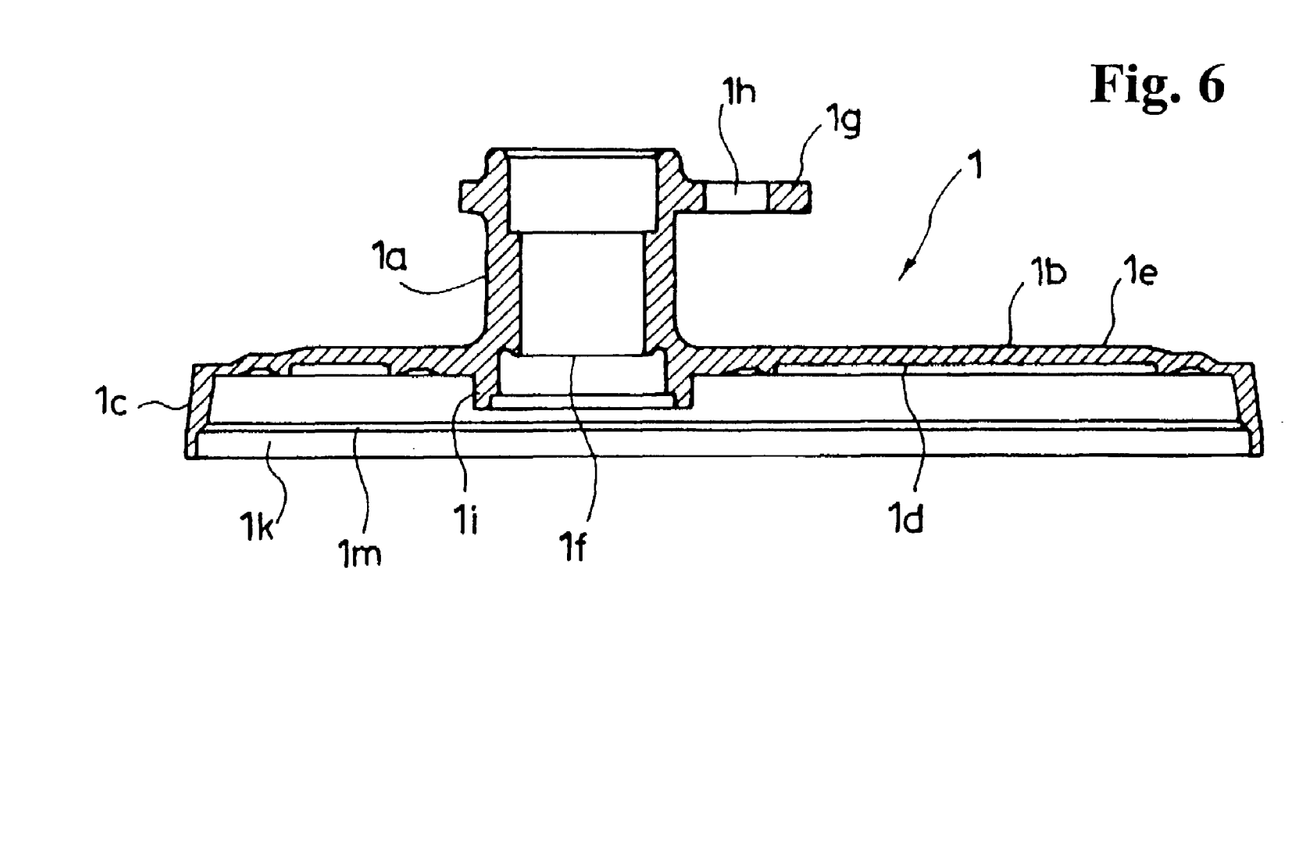
FIG. 6 is a sectional view thereof.
Figure 10:
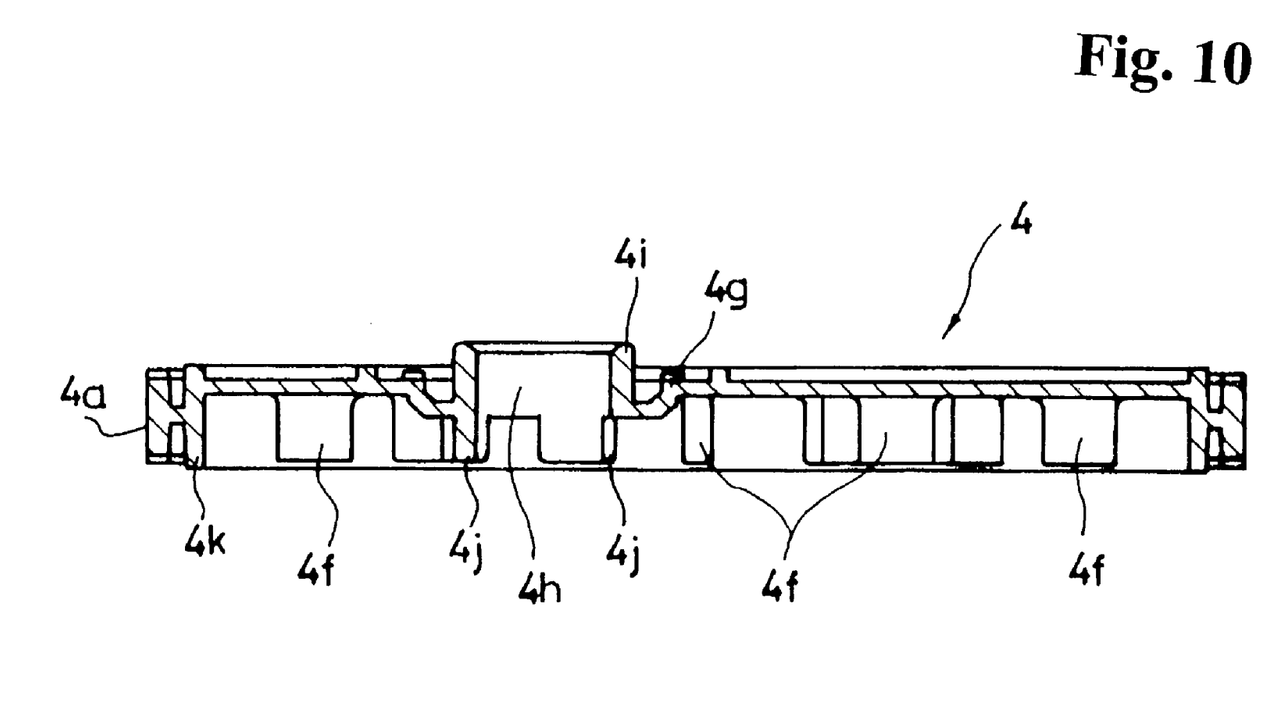
FIG. 10 is a sectional view taken along line 10—10 in FIG. 7.
Figure 11:
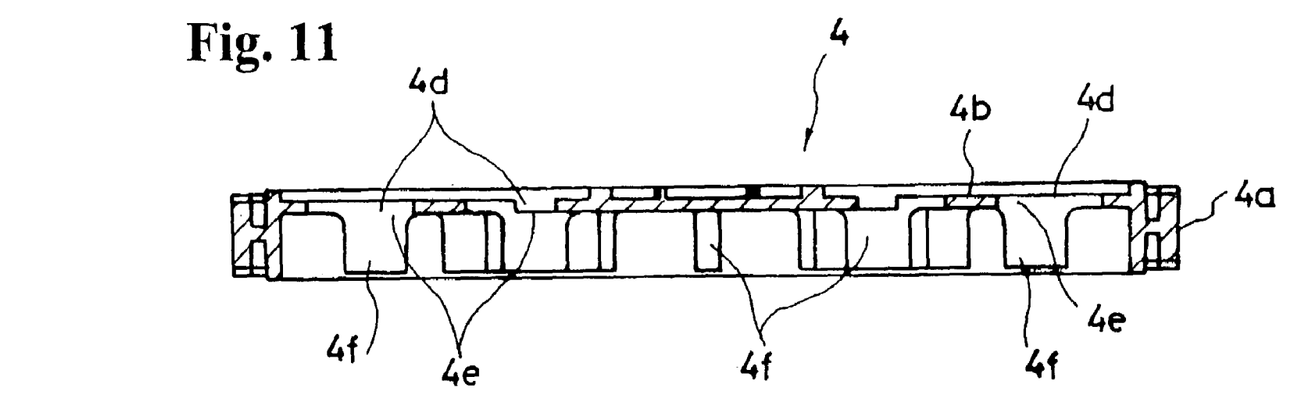
FIG. 11 is a sectional view taken along line 11—11 in FIG. 7.
Figure 12:
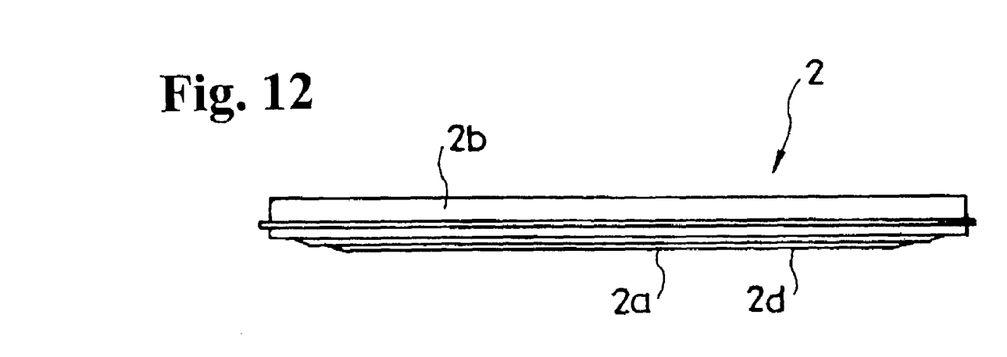
FIG. 12 is a side view of a second member.
Figure 13:
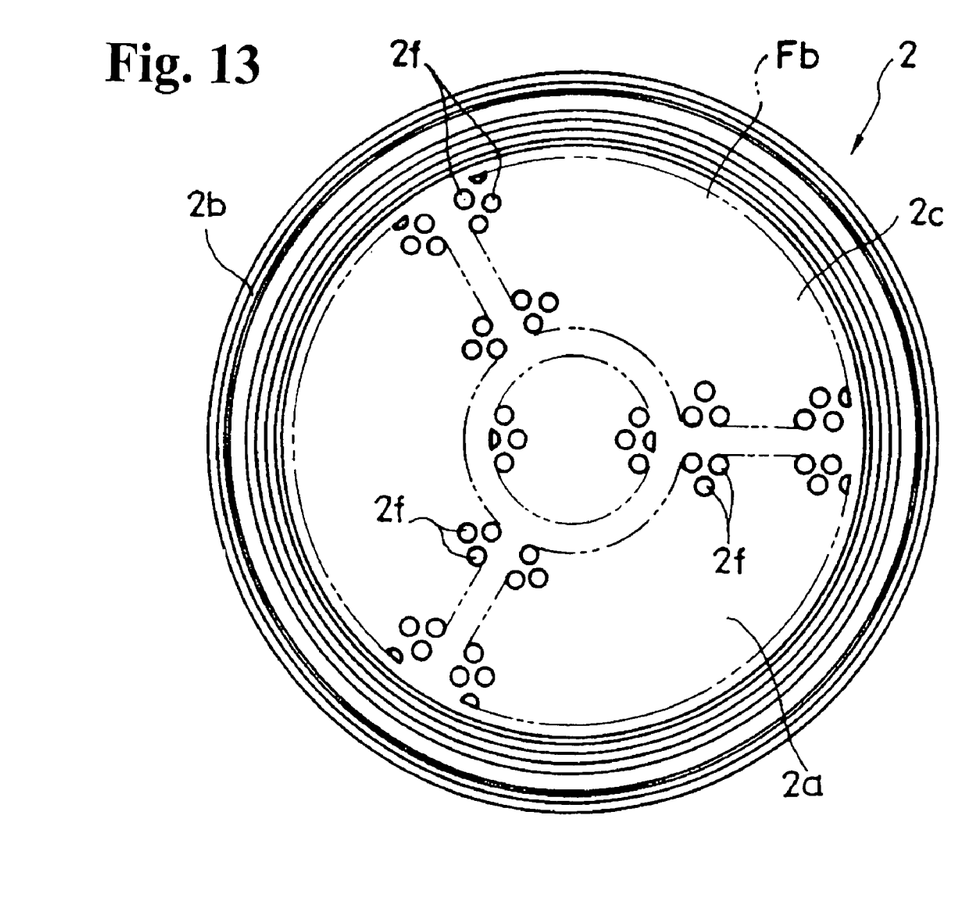
FIG. 13 is a plan view thereof.
Figure 14:
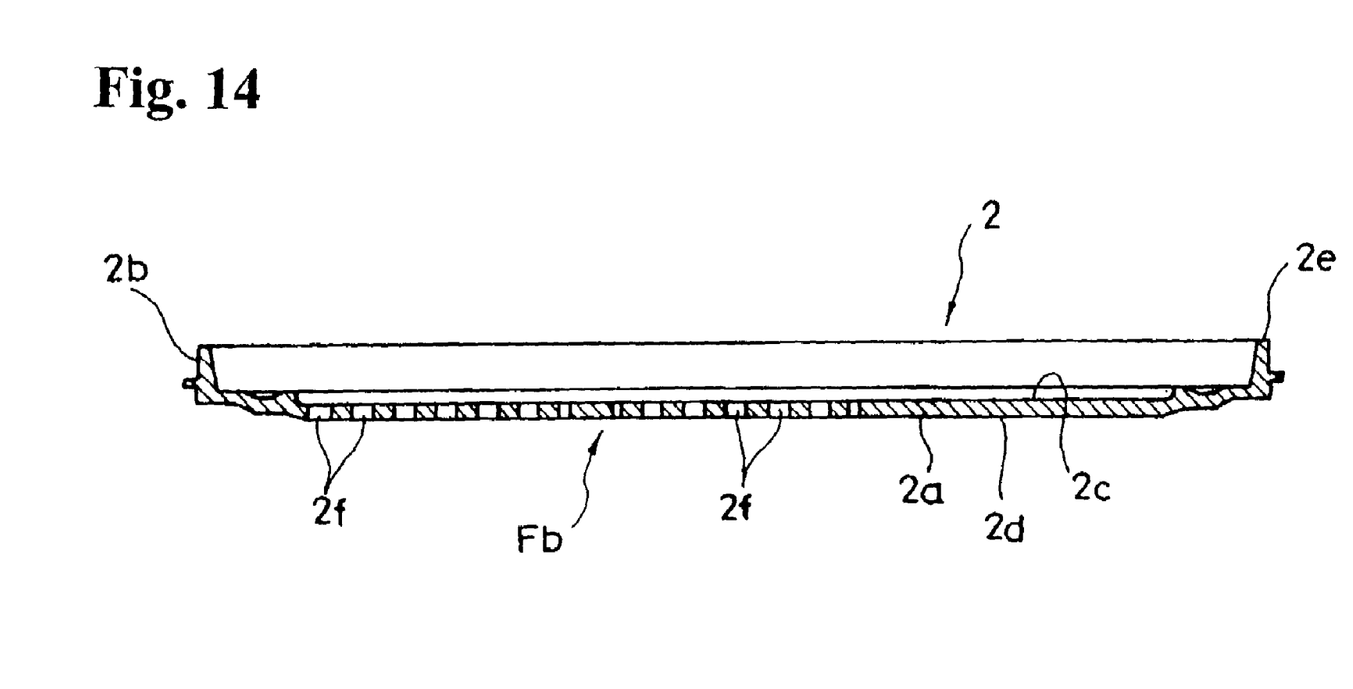
FIG. 14 is a sectional view thereof.
Figure 15:
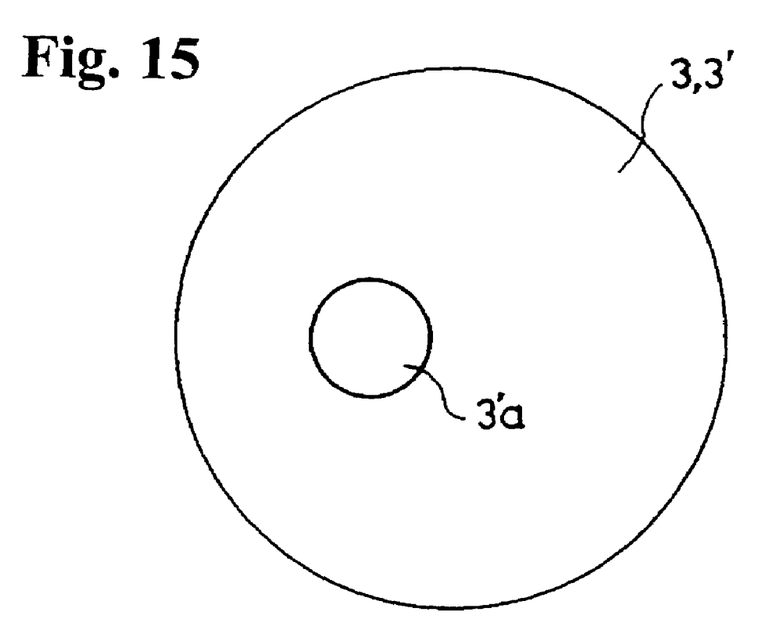
FIG. 15 is a plan view of a first filter member 3'.
Figure 16:
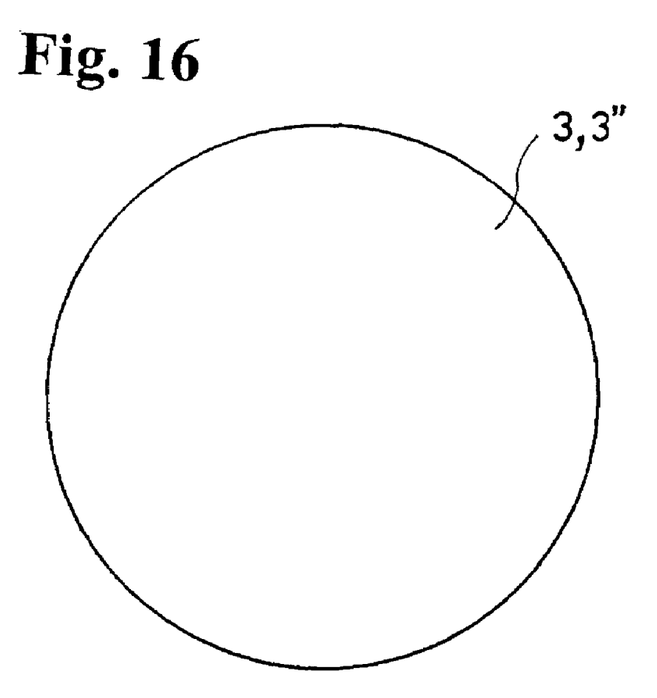
FIG. 16 is a plan view of a second filter member 3"

FIG. 1 is a plan view of a filter device F according to an embodiment of the present invention; FIG. 2 is a bottom view thereof; and FIG. 3 is a sectional view thereof. FIGS. 4 to 6 show a first member 1 constituting the filter device F; FIGS. 7 to 11 show a shape-retaining member 4 constituting the filter device F; FIGS. 12 to 14 show a second member 2 constituting the filter device F; and FIGS. 15 and 16 show a filter member 3 constituting the filter device F, respectively. In FIGS. 1 and 5, small holes 1j constituting an intake portion Fb of the first member 1 are regularly provided in an area surrounded by a phantom line. In FIGS. 2 and 13, small holes 2f constituting an intake portion Fb of the second member 2 are regularly provided in an area surrounded by a phantom line. However, in the respective drawings, only a part of the small holes is shown and the whole small holes are not shown.

Figure 17:
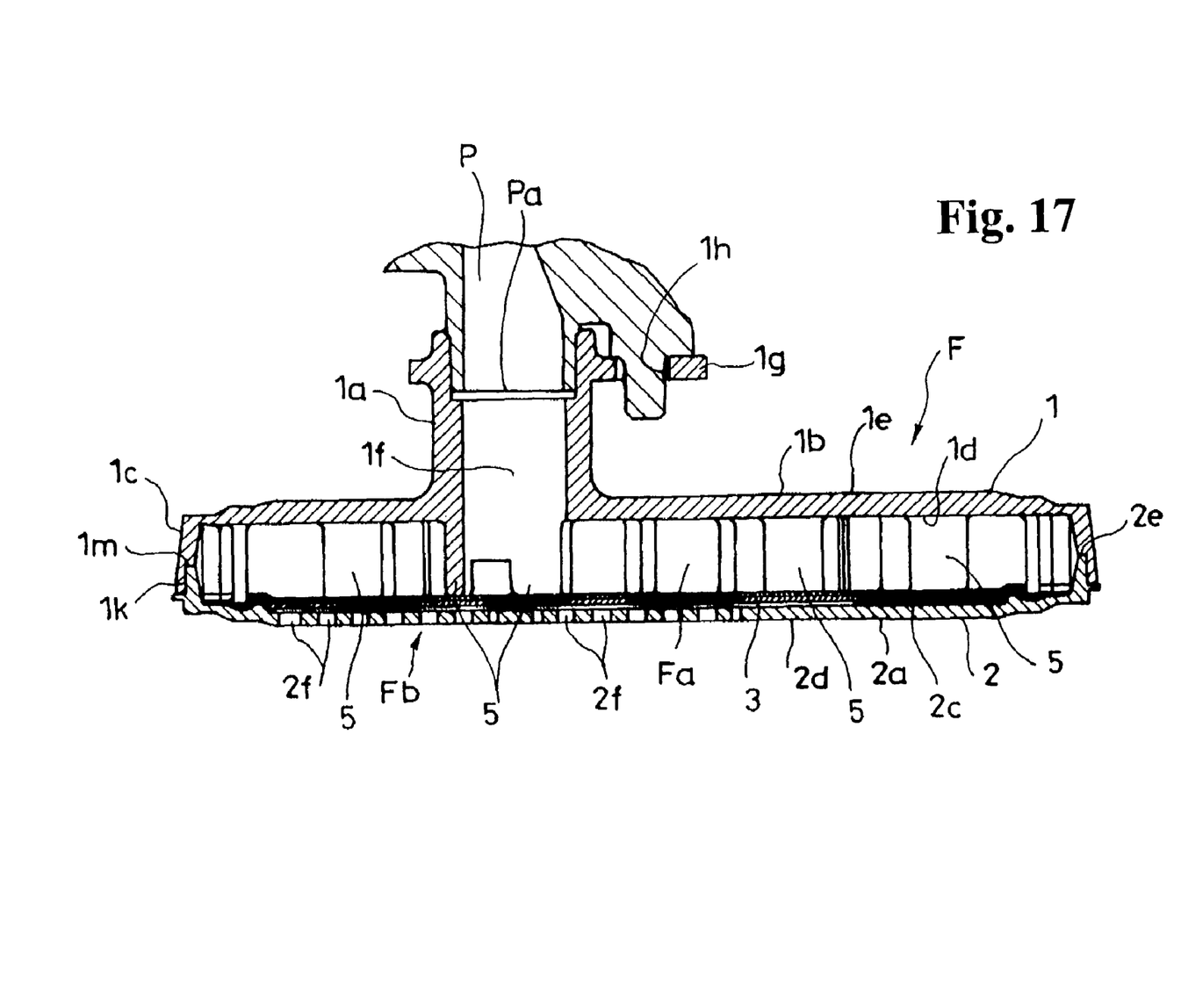
FIG. 17 is a sectional view a filter device F in a use state with a structure different from those in FIGS. 1 to 16.

FIG. 17 is a sectional view showing a filter device F according to another embodiment of the present invention.

The filter device F according to the present invention is attached to a fuel intake port Pa in a fuel tank (not shown) of an automobile, motorcycle or the like, for preventing water or foreign matters from entering fuel transferred to an internal combustion engine through the fuel intake port Pa.

Typically, the filter device. F is attached to the fuel intake port Pa of an intake pipe P positioned in a fuel tank.

Also, a fuel pump disposed inside a fuel tank or a fuel pump disposed outside the fuel tank transfers fuel to the internal combustion engine through the fuel intake port Pa.

The filter device F includes:
(1) a first plastic member 1;
(2) a second plastic member 2; and
(3) a filter member 3.

The first member 1 includes a connecting portion 1a to be connected to the fuel intake port Pa. Also, in the embodiment shown in the drawing, the first member 1 includes a disc-shape portion 1b. The disc-shape portion 1b has a rising portion 1c with a circumferential shape around an outer edge portion thereof on one surface side. One surface of the disc-shape portion 1b where the rising portion 1c is formed becomes an inner surface 1d facing an interior space Fa of the filter device F in a state where the first member 1 is assembled with the second member 2, and the other surface of the disc-shape portion 1b becomes an outer surface 1e.

The connecting portion 1a connected to the intake port Pa is disposed at a position slightly shifted from the center of the disc-shape portion 1b. In the embodiment shown in the drawings, a lower end of the connecting portion 1a communicates with a circular hole 1f provided in the disc-shape portion 1b, so that the connecting portion 1a has a cylindrical shape with both open ends projecting outwardly from an outer surface 1e of the disc-shape portion 1b. In the embodiment shown in the drawings, the intake port Pa of the intake pipe P is inserted into the upper end of the connecting portion 1a to thereby attach the filter device F to the intake port Pa. In the embodiment shown in the drawings, a bracket portion 1g with a plate shape is formed on the upper end of the connecting portion 1a, and projects in a direction substantially orthogonal to a cylindrical axis line of the connecting portion 1a. A positioning projecting portion provided on the intake pipe P is inserted into a through-hole 1h formed in the bracket portion 1g from above, so that the filter device F is attached to the intake pipe P in a stable direction.

A short cylindrical portion 1i is formed to project from the inner surface 1d of the disc-shape portion 1b, and communicates with an upper end of the circular hole 1f. A combining cylindrical portion 4i of the shape retaining member 4, described later, is inserted into the short cylindrical portion 1i, so that the first member 1 and the shape retaining member 4 are assembled. The short cylindrical portion 1i projects from the inner surface 1d of the first member 1 by a length shorter than a projecting length of the rising portion 1c of the first member 1.

A plurality of circular small holes 1j is provided to pass through the disc-shape portion 1b of the first member 1, so that fuel enters the interior space Fa of the filter device F through the small holes. In other words, in the embodiment shown in the drawings, the intake portion Fb of the fuel is formed in the first member 1 with the circular small holes 1j.

The second member 2 is combined with the first member 1 to form the interior space Fa communicating with the connecting portion 1a in the filter device F. In the embodiment shown in the drawings, the second member 2 includes a disc-shape portion 2a. A rising portion 2b with a circumferential shape is formed around an outer edge portion of one surface of the disc-shape portion 2a. The surface with the rising portion 2b becomes an inner surface 2c facing the inner space Fa of the filter device F in an assembled state with the first member 1, and the other surface of the disc-shape portion 2a becomes an outer surface 2d.

The rising portion 2b of the second member 2 has an outer diameter substantially equal to an inner diameter of the rising portion 1c of the first member 1. In the embodiment shown in the drawings, the first member 1 and the second member 2 are assembled with both inner surfaces 1d and 2c facing each other while the outer surface of the rising portion 2b of the second member 2 contacts the inner surface of the rising portion 1c of the first member 1, so that the interior space Fa is formed by the disc-shape portions 1b and 2a and the rising portions 1c and 2b of the first and second members 1 and 2.

More specifically, in the embodiment shown in the drawings, a circumferential concave portion 1k is formed inside the rising portion 1c of the first member 1, and is opened on a projecting side of the rising portion 1c and an inside of the first member 1, respectively. The rising portion 1c of the first member 1 includes a step surface 1m facing a projecting end side of the rising portion 1c with the circumferential concave portion 1k. In the embodiment shown in the drawings, a projecting end 2e of the rising portion 2b of the second member 2 is inserted into the rising portion 1c of the first member 1 to a position where the projecting end 2e of the rising portion 2b of the second member 2 abuts against the step surface 1m of the first member. In the embodiment shown in the drawings, in the assembled state, the outer surface of the rising portion 2b of the second member 2 contacts the bottom surface of the circumferential concave portion 1k of the rising portion 1c of the first member 1 (refer to FIG. 3).

A plurality of circular small holes 2f is formed in and passes through the disc-shape portion 2a of the second member 2, and fuel enters the interior space Fa of the filtering deice F through the small holes 2f. In other words, in the embodiment shown in the drawings, the intake portion Fb of the fuel is formed in the second member 2 with the small holes 2f.

Accordingly, in the embodiment shown in the drawings, the fuel intake portions Fb are formed in the first member 1 and the second member 2, respectively.

The filter member 3 is disposed between the first member 1 and the second member 2 assembled as described above. In other words, the filter member 3 is disposed in the interior space Fa so as to cover the intake portion Fb from a side of the interior space Fa.

In the embodiment shown in the drawings, the fuel intake portions Fb are formed in the first member 1 and the second member 2, so that two sheets of the filter member 3 are disposed between the two members 1 and 2.

One of the two sheets of the filter member 3, i.e. a filter member 3', has a circular shape with a size substantially covering the inner surface of the disc-shape portion 2a of the first member 1. The first filter member 3' includes a hole 3'a for inserting the short cylindrical portion 1i. In a state that the short cylindrical portion 1i is inserted into the hole 3'a, the first filter member 3' covers the inner surface 1d of the first member 1 and filters fuel entering through the intake portion Fb of the first member 1.

The other of the two sheets of the filter member 3, i.e. a second filter member 3", has a circular shape with a size substantially covering the inner surface of the disc-shape portion 2a of the second member 2. The second filter member 3" covers the inner surface 2c of the second member 2 and filters fuel entering through the intake portion Fb of the second member 2.

The filter member 3 may have a single layer structure in a sheet shape or a mat shape, or a multi-layer structure in a sheet shape or a mat shape.

Typically, the filter member 3 is formed of a cloth mesh or a non-woven cloth of synthetic fiber or the like. Also, the filter member 3 may have a multi-layer structure by laminating two or more cloth meshes or non-woven cloths; or by laminating a cloth mesh and a non-woven cloth.

In the filter device F according to the present invention, after the filter member 3 formed in a size and a shape to be fitted between the first member and the second member is positioned between the two members, the two members are assembled. Accordingly, the filter device F can be easily assembled in which fuel entering the interior space Fa of the filter device F is adequately filtered and supplied to the fuel intake port Pa.

Also, since it is not necessary to weld the two members 1 and 2 to integrate, the filter device F can be designed without considering compatibility between a material of the two members 1 and 2 and a material of the filter member 3.

Thus, especially, a plastic material having high fuel resistance, such as polyacetal, can be easily selected for the first member 1 and the second member 2 constituting the main portion of the filter device F, thereby adequately improving quality of the filter device.

The outer shell of the filter device F is formed of the first member 1 and the second member 2, and the filter member 3 is disposed inside thereof. Accordingly, it is possible to provide a variety of structural portions for linking with other devices and structural members disposed in the fuel tank, if necessary, without any problem. For example, in a case that it is convenient that a pump main portion constituting a pump module is supported by the filter device F from below, a supporting portion of the pump main portion can be easily provided to the outer shell of the filter device F without limiting the function of the filter device F.

One of the first and second members 1 and 2 may be provided with a window or concave portion, i.e. a portion to be engaged, and the other may be provided with an elastic projecting portion, i.e. an engaging portion. Accordingly, it is possible to easily maintain the assembled state when the two members 1 and 2 are assembled.

In the embodiment shown in the drawings, the first member 1 and second member 2 are welded at the assembled portions thereof, so that the assembled state can be maintained.

More specifically, in the embodiment shown in the drawings, the projecting end 2e of the rising portion 2b of the second member 2 is welded to the step surface 1m of the first member 1 contacting the projecting end 2e over the whole periphery of the rising portion 2b, so that the assembled state of the two members 1 and 2 can be maintained.

Accordingly, in the embodiment shown in the drawings, it is possible to easily and effectively increase joint strength of the two members 1 and 2. At the same time, it is possible to prevent fuel from leaking through the assembled portions of the two members 1 and 2, so that the fuel does not enter the interior space Fa of the filter device F without being filtered through the filter member 3.

The welding can be typically carried out with ultrasonic welding or high frequency welding.

Also, in the embodiment shown in the drawings, the shape retaining member 4 having the fuel passing portions 4e is disposed between the first and second members 1 and 2.

Figure 7:
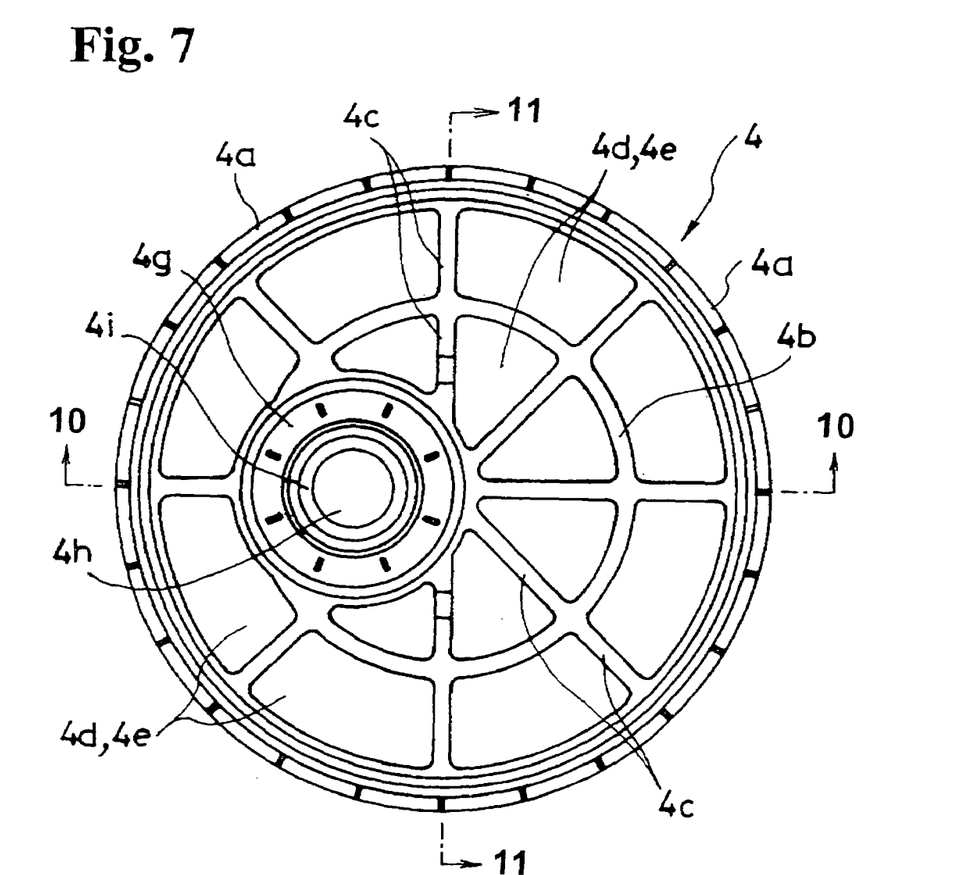
FIG. 7 is a plan view of a shape retaining member.
Figure 8:
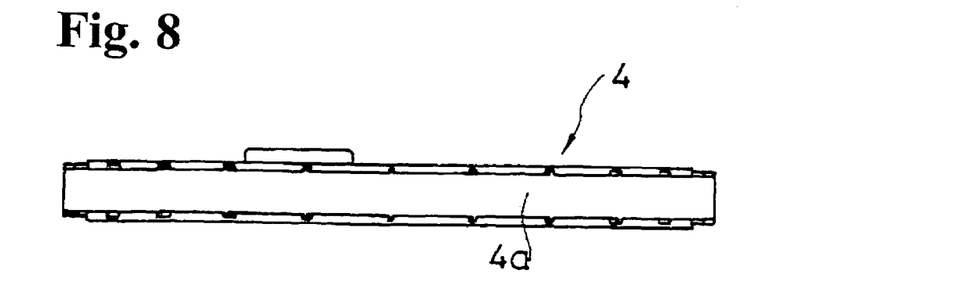
FIG. 8 is a side view thereof.
Figure 9:
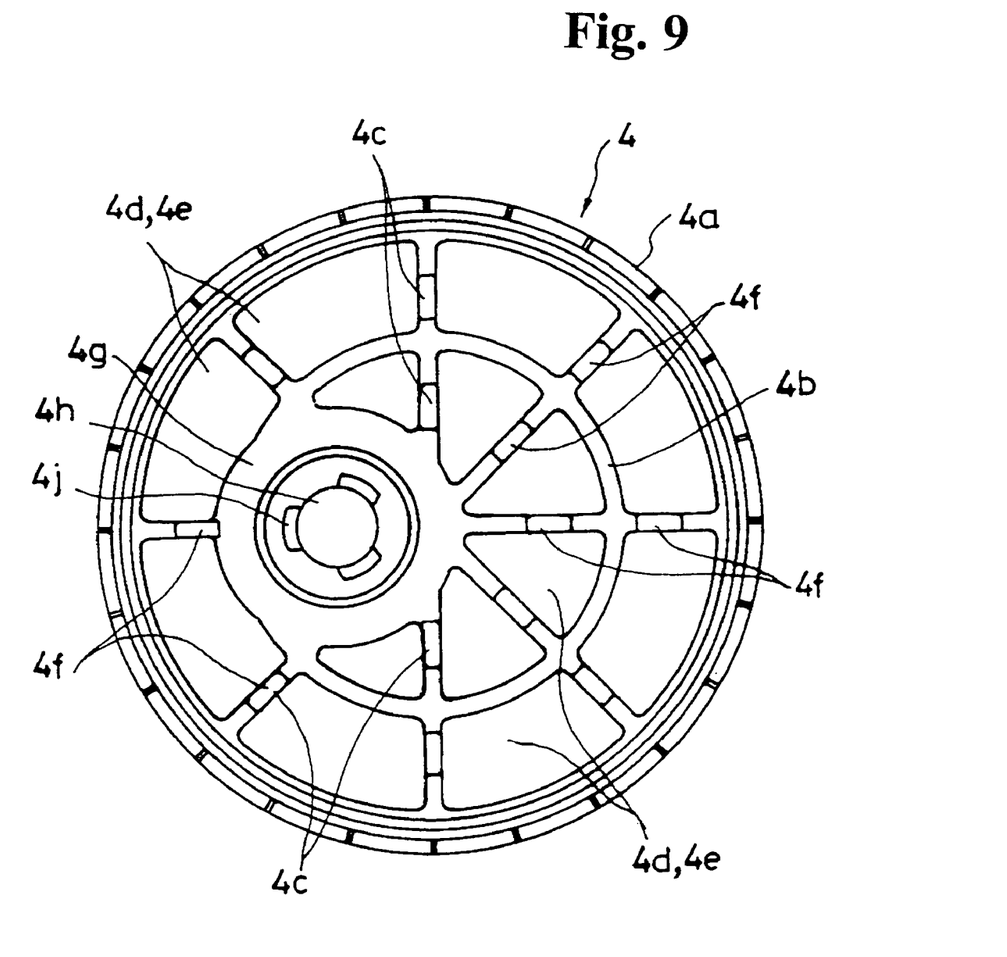
FIG. 9 is a bottom view thereof.

In the embodiment shown in the drawings, the shape retaining member 4 is formed of an outer ring portion 4a having an outer diameter slightly smaller than an inner diameter of the rising portion 2b of the second member 2 and an inner ring portion 4b concentric with the outer ring portion 4a. The ring portions 4a and 4b are connected by a plurality of connecting members 4c extending in the radial direction from the center of the ring portions 4a and 4b. Spaces 4d are formed between the respective adjacent connecting members 4c and 4c, so that fuel can pass through the spaces 4d. In other words, in the embodiment shown in the drawings, the spaces 4d function as the fuel passage portions 4e described above.

Also, in the embodiment shown in the drawings, a plurality of projecting portions 4f projecting from the connecting members 4c on one side of the shape retaining member 4 is formed on the connecting members 4c. A space between the projecting end of the projecting portion 4f and the other surface of the shape retaining member 4 becomes slightly smaller than that between the inner surface 1d of the first member 1 and the inner surface 2c of the second member 2 in the assembled state.

Also, in the embodiment shown in the drawings, a disc-shape portion 4g having a through-hole 4h is formed at a position shifted from the center of the shape-retaining member 4. The disc-shape portion 4g is integrally connected to a short assembling cylindrical portion 4i connected to the through-hole 4h at a lower end thereof on the other surface of the shape-retaining member 4. In the embodiment shown in the drawings, the assembling cylindrical portion 4i is inserted into the short cylindrical portion 1i of the first member 1, so that the shape retaining member 4 is assembled with the first member 1. Also, projections 4j having a length same as that of the projection 4f and projecting from a hole edge portion of the through-hole 4h of the disc-shape portion 4g are formed on the one surface of the shape retaining member 4.

In the embodiment shown in the drawings, with the structure as described above, it is possible to prevent the interior space Fa of the filter device F from being narrowed by the fuel intake pressure. In other words, it is possible to prevent the deformation, so that the inner surface of the first member 1 does not move closer to the inner surface of the second member 2 by such a pressure. Accordingly, it is possible to prevent an effective area of the filter member 3 from being limited to the vicinity of the connecting portion 1a. In other words, it is possible to prevent a situation in which the filter member 3 disposed between the first member 1 and the second member 2 is blocked through the deformation and only the communicating portion between the interior space Fa and the connecting portion 1a becomes the effective area.

Also, in the embodiment shown in the drawings, the first filter member 3' is sandwiched between the first member 1 and the shape retaining member 4, and the second filter member 3" is sandwiched between the second member 2 and the shape retaining member 4, so that the first member 1 and the second member 2 are assembled with the shape retaining members 4 therebetween.

More specifically, in the embodiment shown in the drawings:

(1) The first filter member 3' is placed to cover the inner surface 1d of the disc-shape portion 1b of the first member 1 while the short cylindrical portion 1i of the first member 1 passes through the hole 3'a of the first filter member 3'.

(2) The second filter member 3" is placed to cover the inner surface 2c of the disc-shape portion 2a of the second member 2.

(3) The assembling cylindrical portion 4i of the shape retaining member 4 is inserted into the short cylindrical portion 1i of the first member 1, so that the shape retaining member 4 is assembled with the first member 1.

(4) Then, the first member 1 is assembled with the second member 2 as described above, in which the first filter member 3' is held between the inner surface 1d of the disc-shape portion 1b of the first member 1 and the other surface of the shape retaining member 4, and the second filter member 3" is held between the inner surface 2c of the disc-shape member 2a of the second member 2 and the plural projections 4f of the shape retaining member 4.

Accordingly, in the embodiment shown in the drawings, the filter member 3 is formed in a size to be fitted between the first member 1 and the second member 2, and is disposed between the two members, thereby easily obtaining the structure in which the filter member 3 always properly covers the intake portion Fb.

Incidentally, in the embodiment shown in the drawings, the outer edge portion 4k of the shape retaining member 4 is structured such that a distance between the one surface and the other surface of the shape retaining member 4 is slightly larger than that of other portions. Accordingly, the filter member 3 is firmly held at the outer edge portion 4k in a state that the filter member 3 is pressed by the outer edge portion 4k of the shape retaining member 4.

FIG. 17 shows a filter device F according to another embodiment wherein a portion of the structure described above is modified.

In the filter device F, the first member 1 does not include the fuel intake portion Fb. The shape retaining member 4 in the filter device F shown in FIGS. 1 to 16 is also not included. On the other hand, the first member 1 includes shape retaining projections 5 projecting toward the intake portion Fb formed in the second member 2.

More specifically, a plurality of shape retaining projections 5 projecting downwardly is formed on the inner surface 1d of the first member 1 and has upper ends integrally connected to the inner surface 1d. When the first member 1 and the second member 2 are assembled, a space sufficient for sandwiching the filter member 3 is formed between the inner surface 2c of the disc-shape portion 2a of the second member 2 and projecting ends of the shape retaining projections 5.

In the present embodiment, it is possible to prevent the interior space Fa of the filter device F from being narrowed by the fuel intake pressure through the shape retaining projections 5.

Also, in the present embodiment, the first member 1 and the second member 2 are assembled while the filter member 3 is sandwiched between the shape retaining projections 5 and the second member 2, i.e. between the projecting ends of the shape retaining projections 5 and the inner surface 2c of the disc-shape member 2a of the second member 2. Accordingly, the filter member 3 is formed in a size to be fitted between the first member 1 and the second member 2, and is inserted between the two members, thereby obtaining the structure in which the filter member 3 always properly covers the intake portion Fb.

Other structure of the embodiment shown in FIG. 17 is the same or substantially the same as that of the filter device F shown in FIGS. 1 to 16. The symbols same as those in FIGS. 1 to 16 are assigned to the same components shown in FIG. 17, and their explanations are omitted.

The disclosure of Japanese Patent Application No. 2003-272972 has been incorporated in the application.

While the invention has been explained with reference to the specific embodiments of the invention, the explanation is illustrative and the invention is limited only by the appended claims.

What is claimed is:

1. A fuel filter device comprising:
   a first member having a first disc-shape portion, a cylindrical connecting portion, to be connected to a fuel intake port, extending outwardly from the first disc-shape portion, and a first rising portion extending from an outer periphery of the first disc shape portion in a direction opposite to the connecting portion, said first disc-shape portion, connecting portion and first rising portion being integrally formed together by one plastic member,
   a second member having a second disc portion, and a second rising portion extending from an outer periphery of the second disc portion and attached to first rising portion, said first and second members forming an inner space therebetween communicating with the connecting portion, a plurality of small holes as a fuel intake portion formed in at least one of the first member and the second member, and a filter member disposed in the inner space between the first member and the second member for covering the intake portion from inside for filtering fuel entering through the fuel intake portion.

2. A fuel filter device according to claim 1, wherein said filter member has at least one of a single layer structure and a multi-layer structure in a sheet shape or a mat shape.

3. A fuel filter device according to claim 1, wherein said first member and second member are made of plastic and welded at the first and second rising portions.

4. A fuel filter device according to claim 1, further comprising a shape retaining member having a plurality of fuel passing portions and disposed between the first member and the second member.

5. A fuel filter device according to claim 4, wherein said filter member includes a first filter member disposed between the first member and the shape retaining member, and a second filter member disposed between the second member and the shape retaining member.

6. A fuel filter device according to claim 4, wherein said shape retaining member includes a pressing portion for pressing the filter member against at least one of the first member and the second member.

7. A fuel filter device according to claim 1, wherein at least one of said first member and second member includes a plurality of shape retaining projections projecting toward the other of the first member and second member.

8. A fuel filter device according to claim 7, wherein said filter member is disposed between the shape retaining projections and the other of the first member and the second member which does not have the shape retaining projections.

9. A fuel filter device according to claim 1, wherein said first and second members completely enclose and retain the filter member inside the first and second rising portions.

10. A fuel filter device according to claim 9, wherein said first and second rising portions are directly fixed together without fixing with the filter member.

* * * * *